US008595768B2

(12) United States Patent
Mountain (10) Patent No.: US 8,595,768 B2
(45) Date of Patent: Nov. 26, 2013

(54) ENHANCED PROGRAM PREVIEW CONTENT

(75) Inventor: Dale Llewelyn Mountain, Keighley (GB)

(73) Assignee: Eldon Technology Limited, Steeton, West Yorkshire (GB)

( * ) Notice: Subject to any disclaimer, the term of this patent is extended or adjusted under 35 U.S.C. 154(b) by 0 days.

(21) Appl. No.: 13/475,808

(22) Filed: May 18, 2012

(65) Prior Publication Data

US 2012/0297422 A1 Nov. 22, 2012

(30) Foreign Application Priority Data

May 20, 2011 (EP) ..................................... 11166892

(51) Int. Cl.
*H04N 5/445* (2011.01)
(52) U.S. Cl.
USPC ................... 725/43; 725/39; 725/40; 725/41; 725/42
(58) Field of Classification Search
USPC ..................................................... 725/39–43
See application file for complete search history.

(56) References Cited

U.S. PATENT DOCUMENTS

| 6,005,562 | A | 12/1999 | Shiga et al. | |
| 6,177,931 | B1 * | 1/2001 | Alexander et al. | 725/52 |
| 7,825,989 | B1 | 11/2010 | Greenberg | |
| 2003/0126605 | A1 | 7/2003 | Betz et al. | |

FOREIGN PATENT DOCUMENTS

| EP | 2 309 733 A1 | 4/2011 |
| KR | 2004 0025073 A | 3/2004 |
| KR | 2006 0128295 A | 12/2006 |
| WO | 98/37694 A1 | 8/1998 |
| WO | 2007/064987 A2 | 6/2007 |
| WO | 2007/098067 A1 | 8/2007 |
| WO | 2009/073925 A1 | 6/2009 |

OTHER PUBLICATIONS

Extended European Search Report for EP 11166892.7 dated Oct. 6, 2011, 7 pages.

* cited by examiner

*Primary Examiner* — Dominic D Saltarelli
(74) *Attorney, Agent, or Firm* — Kilpatrick Townsend & Stockton LLP (57) ABSTRACT

Methods and apparatus for providing an enhanced EPG or EPG banner are described. A method of displaying first and second audiovisual content, the first audiovisual content comprising a current program and the second audiovisual content comprising audiovisual content relating to a future program according to a program broadcast schedule, the method comprising receiving the first audiovisual content at a media playback device, receiving the second audiovisual content at the media playback device from a remote content system over a packet-based data network, in response to user input, outputting the first and second audiovisual content to an output device having a screen, and controlling the screen of the output device to display the first and second audiovisual content concurrently. A method of controlling a screen, the display being operable in different modes according to whether a PiP window is shown, and whether currently broadcast or future content is shown.

28 Claims, 5 Drawing Sheets

ENHANCED PROGRAM PREVIEW CONTENT

CROSS REFERENCES

This application claims priority from co-pending European Patent Application No. EP 11166892.7, filed May 20, 2011, entitled "ENHANCED PROGRAM PREVIEW CONTENT," which is hereby incorporated by reference, as if set forth in full in this document, for all purposes.

TECHNICAL FIELD

This invention relates to methods of concurrent first and second audiovisual content display and apparatus for implementing these methods, and particularly to the acquisition of audiovisual clips for display in PiP windows or EPG banners.

BACKGROUND OF THE INVENTION

Modern broadcast media content such as TV programs that are broadcast over a satellite network is often provided with an EPG (Electronic Program Guide) so that users may browse content listings. The EPG or a reduced version of an EPG (such as a channel navigation or EPG banner) can be made available to view on a part of a screen while a first piece of media content such as a TV program continues to play on the rest of the screen. The EPG content may also be provided on a bespoke EPG content channel, separate to the channels used to broadcast program content.

Figure 1:
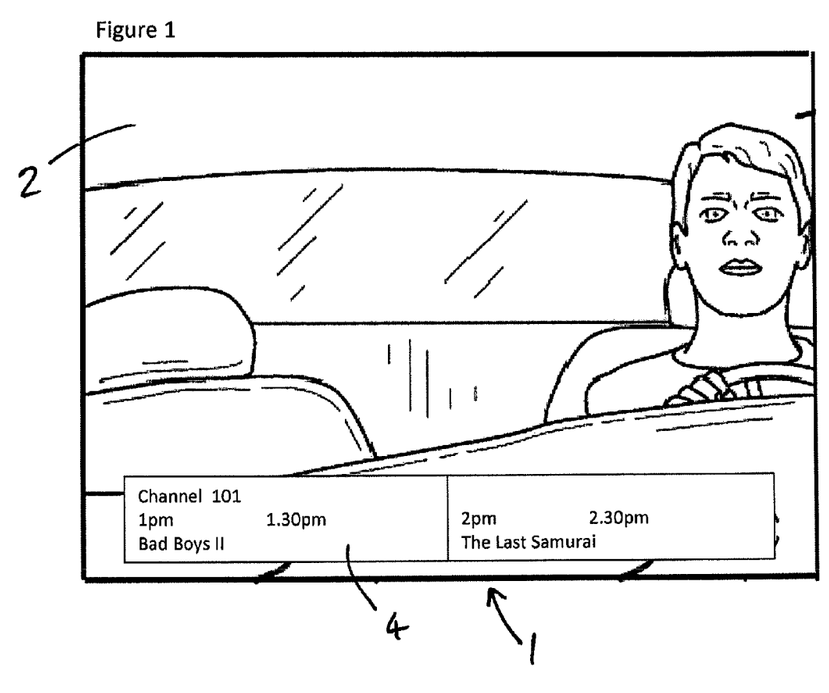
FIG. 1 shows a known TV screen display format.

An example of an EPG banner function is shown in FIG. 1. A screen or monitor 1 of an output device shows a current program 2, which has been received by a media playback device, such as a STB (set-top-box) from a satellite or cable network for example and relayed to the monitor 1. At the request of a user, operating an appropriate button on a remote control, an EPG banner 4 is additionally displayed on the screen while the current program 2 is still being shown. The EPG banner displays textual information about current and future programs. A user may, by using the remote control, navigate through the channels to determine what program content is currently being broadcast, as well as navigate through future time slots for program content scheduled for transmission. Using further buttons on the remote control, a current program may be selected for viewing, in which case the current program displayed on the monitor is updated, or a current or future program can be selected for recording.

However, the information provided to a user by an EPG banner in this way is very limited, and it may be difficult for users to appreciate the nature of the displayed programs simply by assimilating information provided in textual form. We have therefore appreciated that it would be advantageous to provide an enhanced EPG or EPG banner, facilitating clearer navigation of both currently broadcast programs and for future programs.

SUMMARY OF THE INVENTION

The invention is defined in the independent claims to which reference should now be made. Advantageous features are set forth in the appended claims.

According to a first aspect of the invention there is provided a method of displaying first and second audiovisual content, the first audiovisual content comprising a current program and the second audiovisual content comprising audiovisual content relating to a future program according to a program broadcast schedule, the method comprising receiving the first audiovisual content at a media playback device, receiving the second audiovisual content at the media playback device from a remote content system over a packet-based data network, and in response to user input, outputting the first and second audiovisual content to an output device having a screen, and controlling the screen of the output device to display the first and second audiovisual content concurrently. This can provide improved user comprehension of the information being presented.

In one embodiment, the second audiovisual content is displayed in response to a user input request entered via a channel change selection function. This helps provide improved user comprehension of the information being presented.

In one embodiment, the channel change selection function comprises an on-screen graphical user interface (GUI), displaying textual information and scheduling information for current and future broadcast programs. This provides further information to users.

In one embodiment, the user input request is to navigate to part of the channel change selection function displaying information corresponding to audiovisual content for future broadcast.

In one embodiment, the second audiovisual content is displayed on the output device in the graphical user interface (GUI) of the channel change selection function. This provides the information integrally.

In one embodiment, the second audiovisual content is displayed on the output device in a PiP (picture-in-picture) window. This provides greater flexibility as the second audiovisual content may then be displayed separately to the GUI.

In one embodiment, the second audiovisual content is requested from a service provider or from a third party.

In one embodiment, the second audiovisual content is requested using a satellite connection, a wireless connection, a cable connection, and/or a packet-based network connection.

In one embodiment, the second audiovisual content is requested in response to the user input in real or near real time. This avoids the need to store large quantities of data.

In one embodiment, the second audiovisual content and/or the program broadcast schedule is stored on the media playback device or on a local storage module associated with the media playback device. This allows the second audiovisual content to be played straight away without relying on an external connection.

In one embodiment, the second audiovisual content is requested prior to the user input.

In one embodiment, the second audiovisual content is requested periodically. This allows the stored data for future second audiovisual content to be kept up to date.

In one embodiment, the second audiovisual content is selectively requested based on one or more parameters, the parameters comprising popularity ratings, user preferences, and user browsing patterns. This allows for more efficient use of storage and bandwidth.

In one embodiment, the packet-based data network is the Internet.

In one embodiment, the first and/or second audiovisual content comprise video or video with audio.

In one embodiment, the audio of one of the first audiovisual content and the second audiovisual content is muted. This avoids two audio tracks being superimposed on top of one another.

In one embodiment, if both the first and second audiovisual content have an audio element, the audio element of one of the first audiovisual content or the second audiovisual content is muted based on a default setting or a user preference. This provides for the preferred audio track to be chosen.

In one embodiment, the output device comprises one or more of a television, a monitor, a screen, a computer, and/or a loudspeaker.

In one embodiment, the user input is provided via a user input device. In one embodiment, the user input device is a remote controller or a control interface on the media device or the output device.

In one embodiment, the media playback device is a set-top-box (STB) or a computer.

According to a second aspect of the invention there is provided a method for controlling a screen, wherein the display is operable in a first mode, in which a first current program is displayed on the screen, a second mode, in which in response to a user input, a first current program, a second current program and an EPG or EPG banner are shown, and a third mode, in which in response to a user input, a current program, an audiovisual clip and an EPG or EPG banner are shown. This allows for optimal display at appropriate times, and avoids duplication of information.

In one embodiment, the audiovisual clip is shown in a PiP window. In one embodiment, the audiovisual clip is related to a future program. In one embodiment, the second current program is shown in a PiP window.

In one embodiment, the audiovisual clip is obtained by a method of the first aspect of the invention.

In one embodiment, a PiP window is only shown if the current program does not match a highlighted program in the EPG or EPG banner. This avoids duplication of information or unnecessary blank spaces on the display.

According to a third aspect of the invention, there is provided a media playback device configured to carry out one or more of the methods of the first and second aspects of the invention. In one embodiment, the media playback device is a STB.

According to a fourth aspect of the invention, there is provided a system comprising the device of the third aspect of the invention and the output device of the first aspect of the invention, or the screen of the second aspect of the invention.

In one embodiment, the system, additionally comprises the user input device as described in any previous aspect of the invention.

According to a fifth aspect of the invention, there is provided a computer-readable medium having computer-executable instructions for performing the method recited in the first or the second aspect of the invention.

BRIEF DESCRIPTION OF THE DRAWINGS

An embodiment of the invention will now be described by way of example only and with reference to the accompanying drawings in which.

DETAILED DESCRIPTION OF THE PREFERRED EMBODIMENTS

Figure 2:
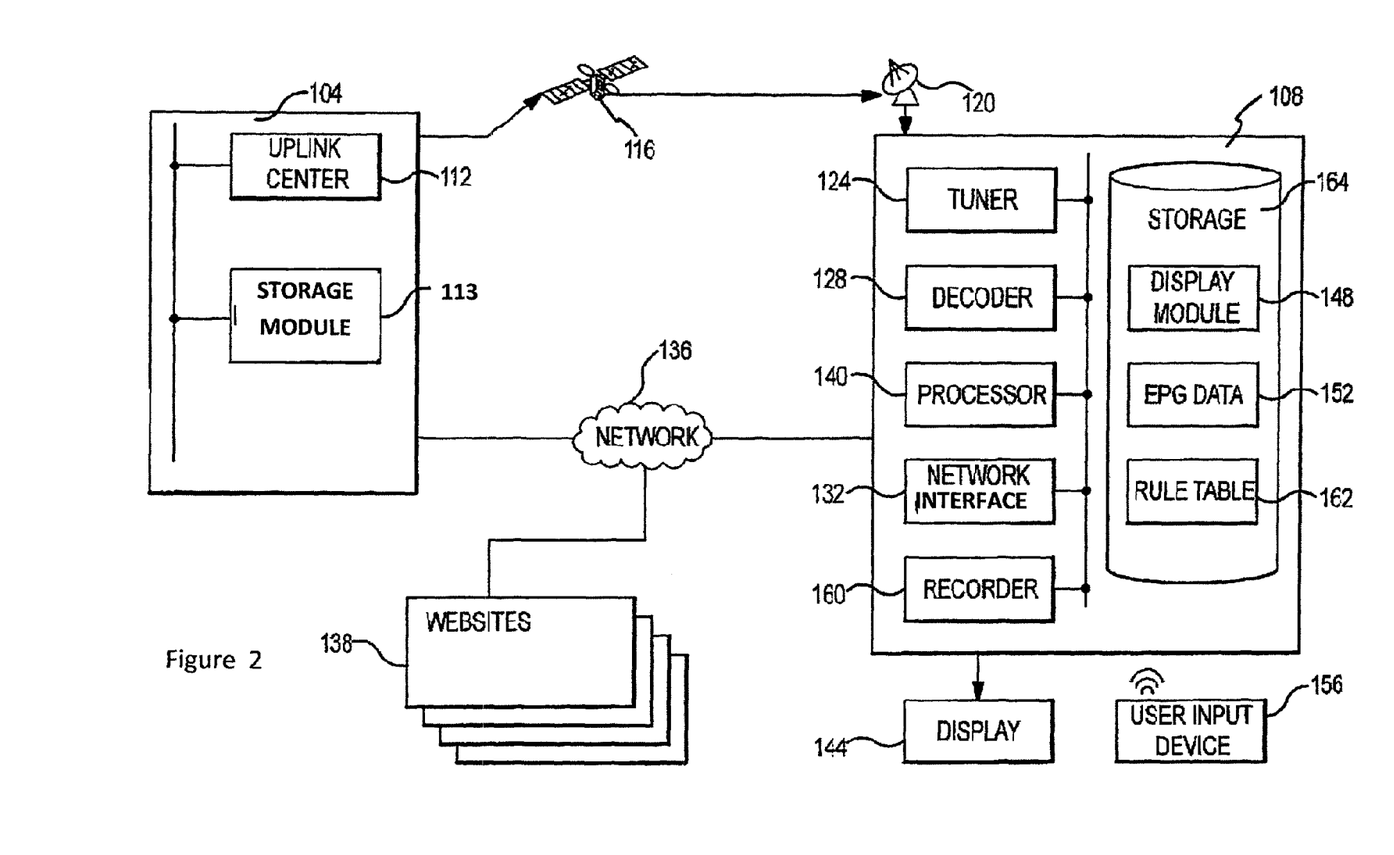
FIG. 2 shows a schematic illustration of a system discussed herein.

FIG. 2 is a schematic illustration of a general operating environment showing components and features of an example embodiment. FIG. 2 includes a service provider 104 that transmits or otherwise provides a program service transmission to a receiver 108, having a media playback device such as a STB (set-top-box), a cable receiver, or a general purpose computer.

The receiver 108 may be associated with or located near an individual, business, or other entity, user or subscriber that receives a program service transmission from the service provider 104. The program service transmission may be received through a subscription to the service. Generally the terms "user" and/or "subscriber" refer to an individual or company who receives a program service transmission. This may include those who have purchased a subscription to the program service transmission. Additionally, the terms "user" and/or "subscriber" may refer to individuals who have been given access to the program service transmission through promotional offers and/or other non-fee-based agreements. There may be more than one service provider 104.

In connection with embodiments that operate in the context of a satellite television service, the service provider 104 may provide a program service transmission through an uplink centre 112. The uplink centre 112 may include a transmitter or other equipment operable to transmit a modulated signal having data representing audio and/or visual content. The modulated signal may be received at a satellite 116, which in turn retransmits the modulated signal to be received at one or more terrestrial locations. The retransmitted signal may be received from the satellite 116 at one or more satellite dishes 120, which are typically associated with one or more receivers 108. A receiver 108 may include a tuner 124 operable to receive the program service transmission signal through the satellite dish 120 and a decoder 128 to decode the received signal. The decoder 128 may be programmed to decrypt or otherwise decode some or all of the received signal in accordance with purchases and selections made by a user.

Embodiments may operate with different product transmission services. Accordingly, although a satellite system is provided as an example of a program service transmission system, other networks or broadcasts for transmitting data may be used by alternative embodiments. For example, embodiments may be implemented in connection with a cable service or a packet data network rather than a satellite system. In this case, the service provider 104 and the receiver 108 may communicate over a communication path that includes various combinations of local and wide area networks and/or the Internet. In such embodiments, the receiver 108 may be configured to access a web site, a file transfer protocol (FTP) site, a file sharing system or site, and so on.

In this example, the receiver includes a network interface 132. The network interface 132 may be operable to communicate or send information across a data network, such as a packet based data network 136. The network interface 132 may take the form of a modem network interface card, cable plug or jack, or the like. Using the network interface, the receiver may communicate over a network 136 such as the public switched telephone network (PSTN). However, it should be appreciated that the network 136 may be any type of network capable of data communication, such as, for example, a local or wide area network or the Internet. The receiver 108 may communicate through the network connection 132 using any suitable communication protocol such as TCP/IP. Through the network interface 132, a user may communicate with the service provider 104. The receiver 108 may also communicate with one or more websites 138 through the network connection 132. In so doing, the receiver 108 may reference and receive information or other content that may be outputted on a display to provide an enhanced or expanded graphical user interface (GUI), in accordance with an example embodiment of the invention. Additionally, the receiver 108 may receive information or other content that may be outputted on a display from the service provider 104. This information could be provided within an optional storage module 113 provided by the service provider 104, or could be provided elsewhere such as on another server. This information could include audiovisual clips or the like.

If the network is the Internet, the service provider employs a server, or server-like device, that accepts commands and information using hypertext transfer protocol (HTTP) requests from a web browser agent, here, the receiver 108. In an exemplary embodiment, the network connection of the receiver is a modem, or modem-like device.

The receiver 108 may additionally include a processor 140 operable to run executable code in connection with various functions associated with the receiver 108. For example, the processor 140 may display graphics, images, animations or other content on a display 144, such as a television (TV) or monitor. In the case of receiving commands or other information relating to changes to the account status, the processor 140 may be further operable to initiate or facilitate transmission of one or more messages to the service provider 104. The processor 140 may be further operable to recall and display stored content, such as purchased or recorded programs.

Among other functions, the processor 140 may also receive, store, and/or display an on-screen graphical user interface (GUI) such as an Electronic Program Guide (EPG), which may provide a schedule of program content and/or other features. As used herein, the terms "electronic programming guide" or "EPG" are intended to encompass an interface that includes a schedule of programming content provided to a user as part of a program service transmission system. The EPG may comprise a database or may otherwise access a database containing information including, for example, names or titles of viewing events (programs), corresponding channel numbers and names, brief descriptions of the programs, start and finish times, and rating and content information related to the events. This information may be called EPG information or program information. Any suitable information may be included in the EPG information. The EPG or program information may be communicated to a set top box (STB) using a dedicated data channel.

The processor 140 executes a display module 148 or program, which accesses stored EPG data 152 and provides a formatted graphic output on the display 144. Further, the EPG data 152 may by compiled at the service provider 104 through the operation of an EPG management module 154 and transmitted to the receiver 108.

For EPG information provided on a specific channel, a tuner in the STB "tunes" to the EPG data channel and collects the EPG information, which is stored in memory of the STB. The EPG information is communicated in a serial fashion to the STB, and thus, has a beginning and an end. For example, the EPG information may start with "program channel 1" and provide programming information for a predefined number of days or the like for that particular channel. Next, EPG information for "program channel 2" for the predefined number of days or the like may follow, and so on, until the EPG information for all "program channels" has been communicated to the STB. The communication of the EPG information then starts again at the beginning of the EPG information. In some instances, the EPG information may simply be repeated. At other times, the EPG information may be updated and then communicated. This looped, periodically repeating communication of the entire EPG information is referred to as a "carousel" EPG information format.

If the STB begins receiving the EPG information midway during the communication of the "carousel" of EPG information, the STB understands that a complete set of EPG information has been received when it has gone through the entire carousel of EPG information. That is, the entire carousel of EPG information has been received when the received EPG information has returned to its initial entry point into the carousel of EPG information.

While the STB is receiving the EPG information, or once the STB has received a full set of EPG information, the STB can construct and display an EPG to a viewer on their viewing device, such as a television or the like. If the entire carousel of EPG information has not yet been received, a partial EPG may be constructed and presented to the viewer.

The viewer is able to interactively scroll about the EPG to view available programming on a program channel of interest. Also, the viewer is able to navigate about the EPG to view textual information related to scheduled programming at future times of interest on selected program channels of interest. Some EPGs are configured, based upon commands received from a remote control, to cooperatively work with a remote control so that the viewer may request selected operations on a program of interest that is highlighted on the EPG. For example, the viewer may select a record feature on their remote control unit such that the highlighted program on the EPG is recorded by a digital video recorder (DVR) in the STB. A reduced EPG may be shown to the viewer in the form of a banner, such as that shown in FIG. 1.

The EPG data channel includes EPG information provided as the carousel of EPG information that is communicated in a periodic, serial fashion. That is, the EPG information in the EPG data channel is communicated in a serial format that is periodically repeated. If the receiver has multiple tuners, one of the tuners may be used to provide viewable programming and another tuner can be used to tune to the EPG data channel to receive the carousel of EPG information.

The processor 140 can also perform such tasks as executing commands received from a user. User commands may be sent to the receiver 108 through a user input device 156 such as a remote or other wireless device, such as a remote control. As used herein, a "user input device" may include any device operable to receive input from a user and to convey the input to the receiver 108. For example, the user input device 156 may be a hand-held device having a number of buttons or keys that when actuated by a user cause the user input device 156 to convey information to the receiver 108 using a suitable communication means, such as an infrared signal. The user input device 156 may include a pointing device or functionality that allows the user to control the position of a cursor that is displayed on the display 144. For example, the user input device 156 may include a track ball or glide plane that may be manipulated to control cursor movements. The user input device 156 may include a motion sensor or accelerometer that allows a user to control displayed items or graphics, such as a cursor, through movements of his or her hand or arm that cause a displacement of the user input device 156. Alternatively, or additionally, the receiver 108 may itself have one or more controllers thereon that are configured to receive instructions from the viewer. It should be appreciated that other input devices such as a computer mouse or touch screen may be used and other communication means, wired or wireless, may be used. Information sent to the receiver 108 may include, for example, a command to change the displayed channel, a command to pause and/or rewind a displayed program, a command to display an EPG and/or a command to navigate through the EPG. Commands sent to the receiver 108 may be entered through a dedicated display menu.

The receiver 108 may include or be associated with a recorder 160, such as a DVR (digital video recorder). The recorder 160 may be integrated into the receiver 108 or may be a stand-alone device. The recorder 160 may be operated by a user who programs the device or receiver function to record a particular program at a specified time. When the program occurs, the recorder 160 will record and store the program, which can then be viewed later. In addition to this functionality, the recorder 160 may buffer a certain amount of content during a currently broadcast transmission. Buffering a currently broadcast transmission allows a user to pause and/or rewind the content of the transmission and to then display the content in a non-live or delayed manner.

The receiver 108 may include or be associated with a memory or other storage device 164, such as magnetic or optical storage. The storage device 164 may be operable to store data received from the decoded satellite signal. The storage device 164 may be operable to store data received from the decoded satellite signal. The storage device 164 may be volatile or non-volatile memory implemented using any suitable technique or technology such as, for example, random access memory (RAM), disk storage, flash memory, solid state, and the like. The storage device 164 may be located either within the receiver or separately from the receiver. The storage device may also be removable in nature. The stored data set may include audio and/or visual content to be transmitted and displayed through the display 144. Generally, audiovisual or audiovisual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video. As a result commands or settings from a user, videos or other programs may be stored locally in storage device 164. Stored programs may include for example recorded broadcasts, pay-per-view items and/or buffered portions of a current video broadcast. The receiver itself and/or the storage device may contain various partitions or separate storage portions and may include a program buffer, a DVR digital video recorder, an EPG access logic storing portion, and/or an EPG information storing portion.

The storage device 164 may additionally store an application, file, module or other data that is useable by the processor 140. In one instance, a stored application may be executed by the processor 140 to display content on the display 144, for example display module 148. As used herein, an application or module includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor. Alternatively, the processor or the receiver may comprise a presentation device interface portion to hold this code.

Figure 3:
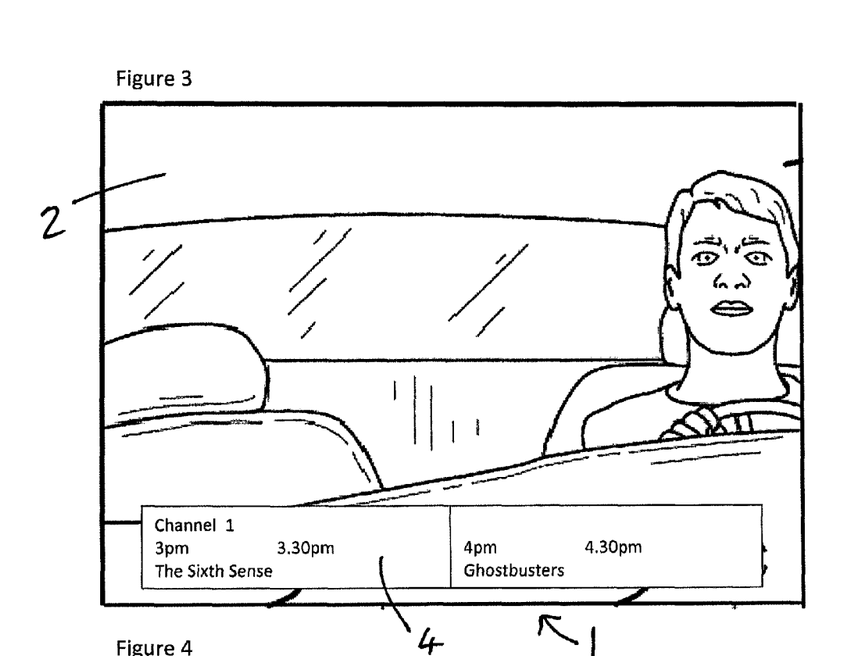
FIGS. 3 to 5 show a TV screen display according to an example of the invention.

An exemplary embodiment of the invention from a user's perspective is now described with reference to FIGS. 3, 4 and 5. With reference to FIG. 3, a monitor 1 shows a current program 2. On a command from a user, such as the pressing of a directional button on a remote control, an EPG banner 4 is additionally shown on the screen. The EPG banner initially displays information about the program currently being watched and future programs on the same channel, although the initial default display may be set to another time or channel. By further pressing of buttons on a remote control, the user may manipulate the EPG banner to show various information about current and future programs on the same and different channels.

Figure 4:
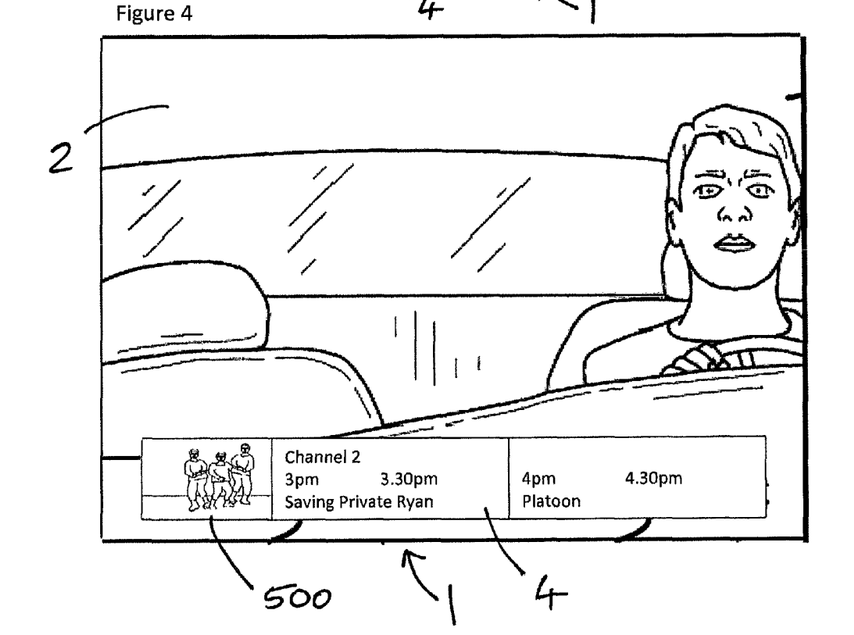

Moving to FIG. 4, a PiP (picture-in-picture) window 500 is also provided, either integrally with the EPG or EPG banner 4 or separate from it, to show a second piece of media content on a portion of the screen simultaneously to the first piece of media content. When a PiP window is used in conjunction with an EPG, the PiP window can display the audiovisual information associated with the media content currently highlighted or selected in the EPG, which may take the form of a preview of the media content.

In the example in FIG. 4, the user has changed the information in the EPG banner from displaying information about channel 1 to information about channel 2 by pressing a button. Now that the program highlighted in the EPG banner (in this example, simply the program shown leftmost in the EPG banner) is not the currently broadcast program, a PiP window 500 is automatically added to the display to display audiovisual content relevant to the highlighted program, in this case a program that is currently being broadcast on a separate channel.

Figure 5:
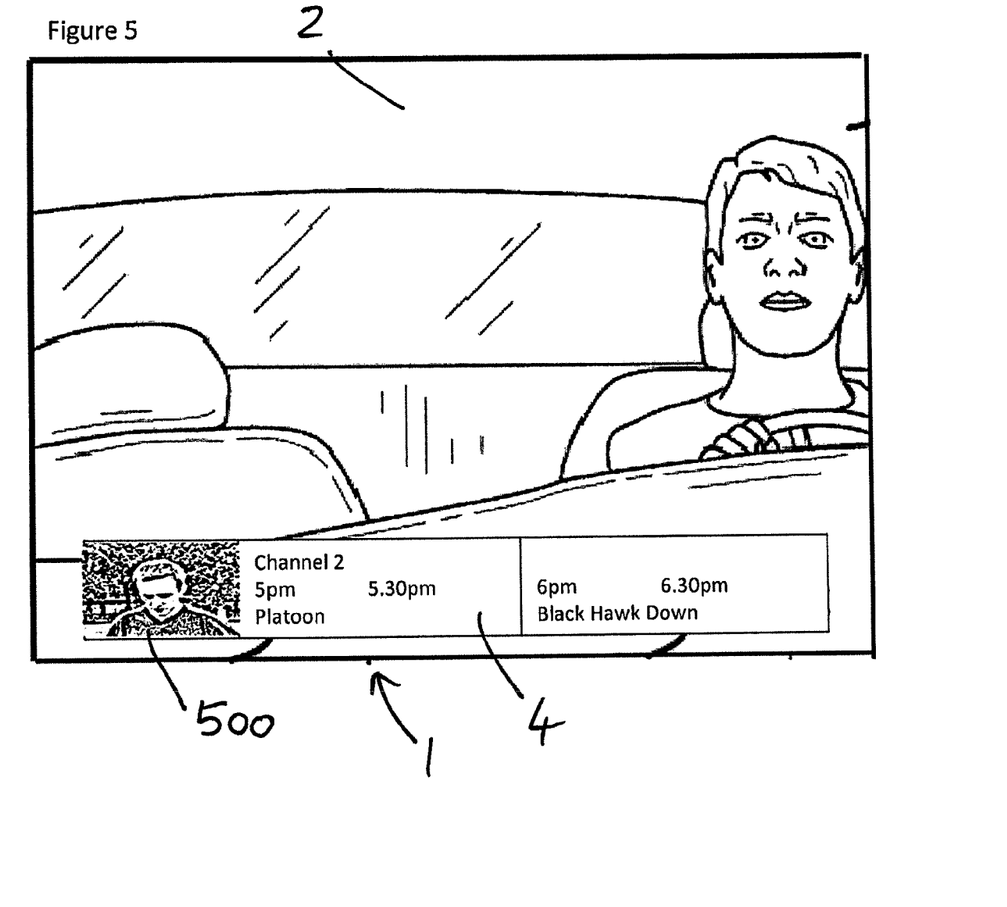

In FIG. 5, the user has further manipulated the information displayed by the EPG banner to highlight a program scheduled for future broadcast. As there is no current broadcast of this program, the media playback device displays audiovisual content corresponding to a portion of the future broadcast program, that has been obtained in advance, and displays this in the PiP window. In this way, a user is able to view within the EPG or channel change selection function, audiovisual content corresponding to programs that are scheduled for future broadcast. This greatly facilitates user comprehension of the EPG and scheduling information being presented to them, and means that a user no longer has to rely solely on the title of the program to determine interest where the program is as yet unviewed, or to recollect the content where the content has been viewed. The presentation of audiovisual information also allows user who have impaired visual acuity or difficulty reading to use the EPG more effectively.

The highlighted program currently selected by the user in the EPG banner is the program for which the PiP window shows the additional audiovisual preview or information. A program may be highlighted automatically, as the user navigates through the EPG using directional buttons on the remote. In the example above, the highlighted program is simply the program shown leftmost in the EPG banner. Alternatively, the user may be able to move the highlighted position on the EPG banner to different times, without simultaneously altering the position of the information on the screen. There may be no physical indication of which program is highlighted, or alternatively the highlighted program, time or time slot may be indicated in some way on the screen, for example shown as a different colour to the rest of the EPG banner. Other methods of highlighting are also possible.

One or both of two concurrently shown pieces of audiovisual content may include audio. In the example of FIG. 5, the current program and the PiP window content may include audio as well as video. In the case where there are two audio tracks that would otherwise be played at the same time, it is preferable to mute one or both of the audio tracks. The audio element of the current program and/or the PiP content may be muted based on a default setting, a user preference, a button on a user input device, a user selection using a cursor on the EPG or EPG banner, or another appropriate selection method.

Figure 6:
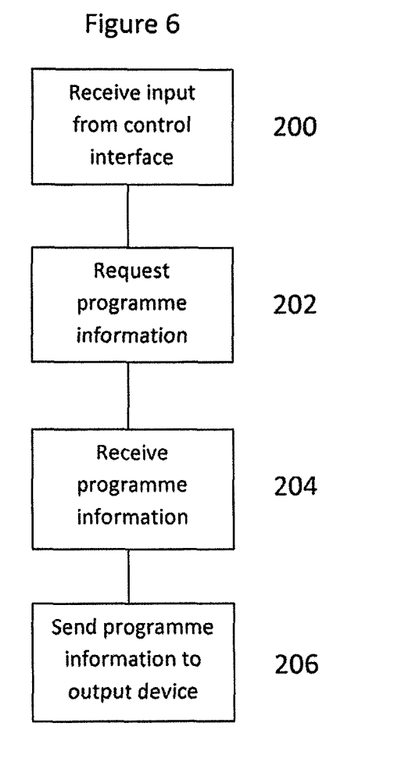
FIG. 6 shows a flow chart of a method according to one aspect of the invention.

FIG. 6 shows a flowchart illustrating a method of receiving and displaying audiovisual content for display in the EPG or EPG banner. Initially, at step 200, the receiver or media playback device receives an input from a control interface or a user input device, requesting audiovisual content. This request may take the form of a user selecting a program in a list on the EPG using a user input device 156, or simply moving the highlight cursor of the EPG into the program in the manner described above, whereupon the receiver needs to source a audiovisual clip or suchlike to display.

At step 202, the receiver 108 sends a request for the audiovisual content to the service provider 104 or from a third party provider. The request may be made by any appropriate means, such as a cable network or a data packet network such as the Internet. At step 204, the receiver 108 receives audiovisual content from the service provider 104.

At step 206, the receiver 108 sends the audiovisual content to an output device such as display 144. The display 144 will then output the audiovisual content. The audiovisual content may be, for example, a video clip with or without sound. At step 206, the receiver may additionally control the screen of the display 144 to display the audiovisual content and other audiovisual content concurrently. In this example, the audiovisual content corresponding to the EPG preview of a future program is retrieved on demand from the server provider in response to a user request.

Figure 7:
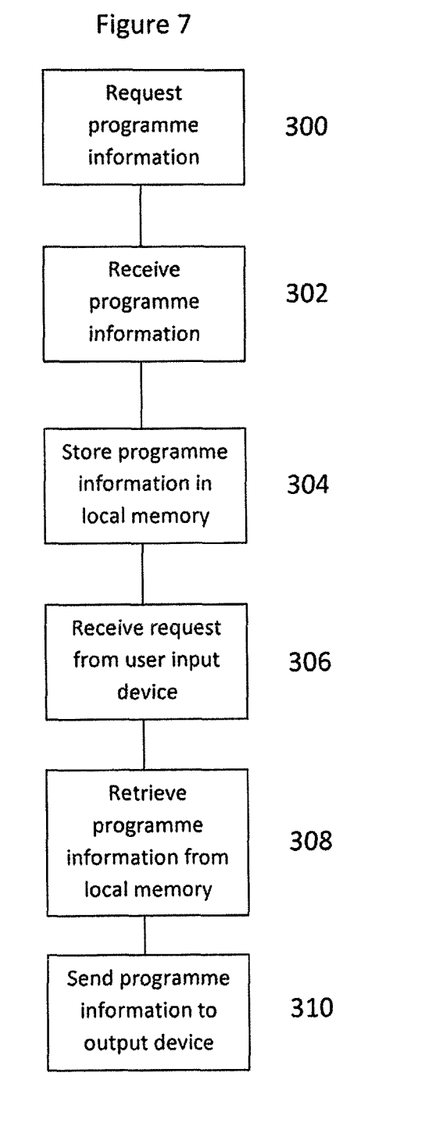
FIG. 7 shows a flow chart of a method according to a second aspect of the invention.

In another embodiment, illustrated by the flowchart in FIG. 7, the audiovisual content is pre-emptively provided. At step 300, the receiver requests audiovisual content from the service provider for one or more future programs. Optionally, the receiver is routinely sent the audiovisual content by the service provider, either at set times or upon initiation of the receiver. In this case, step 300 is not required, and the method starts with operation 302. At step 302, the receiver receives audiovisual content from the service provider, in a similar way to step 204 in FIG. 6.

At step 304, the receiver stores the received audiovisual content in local memory. The local memory may be within a storage device 164 or in another storage medium within or linked to the receiver, such as a PVR (personal video recorder) or an external hard drive.

At step 306, the receiver receives a request for audiovisual content from a user input device, similarly to step 200 in FIG. 6. At optional step 308, the receiver retrieves the requested audiovisual content from local memory. This could comprise retrieving the requested audiovisual content from a local memory and adding the requested audiovisual content to a local cache memory or to the display module memory 148. At step 310, the receiver provides audiovisual content to an output device, similarly to step 206 in FIG. 3.

In the method outlined in FIG. 7, the receiver may be provided with all the appropriate audiovisual content for all channels for a pre-determined time period. For example, at a set time of day or upon initiation of the receiver, all the available audiovisual content for all future programs for the rest of the day are acquired. Alternatively, the service provider may provide a selection of audiovisual content for just the most popular programs, or for a set of programs which, based on past viewing habits, the service provider anticipates that the user of the receiver is likely to wish to view.

Other strategies can also be used to choose which audiovisual content is provided, based on data acquired by the individual receiver. For example, audiovisual content could be provided for future programs on the channel that the user is currently watching, or for favourite program channels selected by the user. Short-term pre-emptive requests for audiovisual clips could also be made. For example, when a user accesses a particular channel on the EPG, some or all of the clips for that particular channel could immediately be requested or automatically provided by the service provider.

In some embodiments, as an alternative or additional feature, audiovisual content for the most imminent programs may be the first to be retrieved, followed by audiovisual content for later scheduled programming. Other systems and patterns of pre-emptive audiovisual content storage based on user habits and real-time user browsing could also be employed.

A temporary storage approach to audiovisual content acquisition could be used, whereby audiovisual content acquired pre-emptively is only stored briefly, and is then deleted after a short period of time, for example five minutes after being loaded, or five minutes after a user stops browsing the EPG. In any case, acquired audiovisual content would normally be deleted or overwritten at a later date, to allow for reuse of memory resources.

In some embodiments where the network provides for high speed communications, some of all audiovisual content may be provided on a dynamic basis. Thus, no permanent memory storage capacity is used in the receiver's memory. In this case, the receiver is operable to retrieve audiovisual clips of interest on a dynamic real time basis, or near real time basis.

Any other audiovisual content that has not been pre-emptively downloaded in this manner, and that subsequently becomes needed, can still be provided using the method described in FIG. 6.

Some or all of the audiovisual content may be provided by third parties rather than by the service provider. For instance, for programs scheduled on TV channel BBC1, the receiver may request information directly from the BBC via the Internet, or the BBC may routinely provide the audiovisual content without prompting. The audiovisual content could be sourced from one or more websites 138. Instructions on where the receiver should source the audiovisual content may be part of the EPG metadata in the relevant block of EPG data routinely provided to the receiver by the service provider.

As discussed elsewhere, a browser or the like may be integrated into the EPG access logic. Accordingly, when the remote EPG content system is implemented as an internet accessible system, the browser can access EPG information of interest. Alternatively, the browser may be separately implemented as part of another component and/or function.

By extension of the methods described herein, other supplemental information that may be of interest to the viewer may be additionally provided over the network link. For example, additional program description information may include additional information on the program plot or story line, additional information pertaining to program actors or performers, and/or may provide information about related programming. Such supplemental information can be too voluminous for inclusion in the carousel of EPG information. Memory requirements to store the supplemental information in the receiver may be too extensive to justify memory costs. The time to receive an entire carousel of EPG information that includes the supplemental information for every program described in the EPG may be to long to be practical.

The audiovisual content may be formatted using a suitable video data standard, such as, but not limited to, the moving pictures experts group (MPEG) digital video broadcasting (DVB) standard or the American television standards committee (ATSC) standard. Thus, the EPG information is encoded using a common internet protocol (IP) format that may be selectively accessed by the receiver. For example, HTTP or XML formats may be used.

An exemplary embodiment of the receiver 108 is a set top box (STB). Embodiments may be implemented in other media devices, such as, but not limited to, stereos, radios, televisions (TVs), digital video disc (DVD) players, digital video recorders (DVRs), personal device assistants (PDAs), or personal computers (PCs).

While the network is preferably the Internet, in some embodiments the network may also be a telephony system, a radio frequency (RF) wireless system, a microwave communication system, a fibre optics system, an intranet system, a local access network (LAN) system, an Ethernet system, a cable system, a radio frequency system, a cellular system, an infrared system, a satellite system, or a hybrid system comprised of multiple types of communication media.

In an Internet-based environment, the receiver establishes a link to the service provider via the network, such as, but not limited to, World Wide Web (WWW). The link may be a persistent connection. Non-limiting examples of possible persistent type connections are a HTTP keep-alive or a HTTP connection reuse. In other embodiments, particularly where the link can be quickly established, the link is established on an as-needed basis.

As used herein, a "receiver" may be any device capable of receiving audiovisual content included in a broadcast or other program service transmission from a service provider. For example, a receiver may include a set-top-box (STB), a cable box, general purpose computer, and so on. As used herein, a "service provider" may include any entity that provides a program service transmission to a receiver such as, without limitation, a satellite television distributor, a direct television provider or a cable television company. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example from a cable headend to a cable receiver), including Internet Protocol (IP) television transmissions, a wireless network such as a radio frequency or infrared network, and so on.

The above description includes only one PiP window. In some embodiments, two or more PiP windows may be simultaneously displayed.

Various modifications to the embodiments described are possible and will occur to those skilled in the art without departing from the invention which is defined by the following claims.

The invention claimed is:

1. A method of displaying first and second audiovisual content, the first audiovisual content comprising a current program and the second audiovisual content comprising audiovisual content relating to a future program according to a program broadcast schedule, the method comprising:
   receiving the first audiovisual content at a media playback device;
   receiving the second audiovisual content at the media playback device from a remote content system over a data network;
   in response to user input, outputting the first and second audiovisual content to an output device having a screen; and
   controlling the screen of the output device to display the first and second audiovisual content concurrently, wherein the second audiovisual content is displayed on the output device in a PiP (picture-in-picture) window, wherein a PiP window is only shown if the current program does not match a highlighted program in the EPG or EPG banner.

2. The method of claim 1, wherein the second audiovisual content is displayed in response to a user input request entered via a channel change selection function.

3. The method of claim 2, wherein the channel change selection function comprises an on-screen graphical user interface (GUI), displaying textual information and scheduling information for current and future broadcast programs.

4. The method of claim 3, wherein the user input request is to navigate to part of the channel change selection function displaying information corresponding to audiovisual content for future broadcast.

5. The method of claim 1, wherein the second audiovisual content is displayed on the output device in the graphical user interface of the channel change selection function.

6. The method of any of claim 1, wherein the channel change selection function is one or more of: an EPG or EPG banner.

7. The method of claim 1, wherein the second audiovisual content is requested from a service provider or from a third party.

8. The method of claim 7, wherein the second audiovisual content is requested using one or more of: a satellite connection, a wireless connection, a cable connection, or a packet-based network connection.

9. The method of claim 7, wherein the second audiovisual content is requested in response to the user input in real-time.

10. The method of claim 1, wherein the second audiovisual content and/or the program broadcast schedule is stored on one or more of: the media playback device or on a local storage module associated with the media playback device.

11. The method of claim 10, wherein the second audiovisual content is requested prior to the user input.

12. The method of claim 10, wherein the second audiovisual content is requested at a discrete interval.

13. The method of claim 10, wherein the second audiovisual content is selectively requested based on one or more parameters, the parameters including one or more of: popularity ratings, user preferences, or user browsing patterns.

14. The method of claim 1, wherein the data network is the Internet.

15. The method of claim 1, wherein the first and/or second audiovisual content comprise video or video with audio.

16. The method of claim 1, wherein the audio of one of the first audiovisual content and the second audiovisual content is muted.

17. The method of claim 1, wherein if both the first and second audiovisual content have an audio element, the audio element of one of the first audiovisual content or the second audiovisual content is muted based on a default setting or a user preference.

18. The method of claim 1, wherein the output device comprises one or more of: a television, a monitor, a screen, a computer, or a loudspeaker.

19. The method of claim 1, wherein the user input is provided via a user input device.

20. The method of claim 1, wherein the user input device is a remote controller or a control interface on the media device or the output device.

21. The method of claim 1, wherein the media playback device is a set-top-box (STB) or a computer.

22. A method for controlling a screen, the method comprising:
   displaying a first mode, in which a first current program is displayed on the screen;
   displaying a second mode, in which in response to a user input, a first current program, a second current program and an EPG or EPG banner are shown; and displaying a third mode, in which in response to a user input, a current program, an audiovisual clip and an EPG or EPG banner are shown, wherein the audiovisual clip is shown in a PiP window, wherein a PiP window is only shown if the current program does not match a highlighted program in the EPG or EPG banner.

23. The method of claim 22, wherein the second current program is shown in a PiP window.

24. The method of claim 22, wherein the audiovisual clip is related to a future program.

25. A media playback device configured to display a first and a second audiovisual content, the first audiovisual content comprising a current program and the second audiovisual content comprising audiovisual content relating to a future program according to a program broadcast schedule, the device comprising:
   a receiver configured to receive the first audiovisual content and the second audiovisual content from a remote content system over a data network; and
   a controller configured to output the first and second audiovisual content to an output device having a screen in response to user input; and further configured to control the screen of the output device to display the first and second audiovisual content concurrently, wherein the second audiovisual content is displayed on the output device in a PiP (picture-in-picture) window, wherein a PiP window is only shown if the current program does not match a highlighted program in the EPG or EPG banner.

26. A media playback device having a controller configured to control a screen, the device comprising:
   the screen, wherein the screen is configured to be operable in:
   a first mode, in which a first current program is displayed on the screen;
   a second mode, in which in response to a user input, a first current program, a second current program and an EPG or EPG banner are shown; and
   a third mode, in which in response to a user input, a current program, an audiovisual clip and an EPG or EPG banner are shown, wherein the audiovisual clip is shown in a PiP window, wherein a PiP window is only shown if the current program does not match a highlighted program in the EPG or EPG banner.

27. The device of claim 26, wherein the media playback device is a STB.

28. A non-transitory computer-readable medium for displaying first and second audiovisual content, the first audiovisual content comprising a current program and the second audiovisual content comprising audiovisual content relating to a future program according to a program broadcast schedule, having sets of instructions stored thereon which, when executed by a computer, cause the computer to:
   receive the first audiovisual content at a media playback device;
   receive the second audiovisual content at the media playback device from a remote content system over a data network;
   in response to user input, output the first and second audiovisual content to an output device having a screen; and
   control the screen of the output device to display the first and second audiovisual content concurrently, wherein the second audiovisual content is displayed on the output device in a PiP (picture-in-picture) window, wherein a PiP window is only shown if the current program does not match a highlighted program in the EPG or EPG banner.

\* \* \* \* \*